US008501019B2

(12) United States Patent  (10) Patent No.: US 8,501,019 B2
Schomburg  (45) Date of Patent: Aug. 6, 2013

(54) DEVICE FOR SEPARATING FLUID MIXTURES, IN PARTICULAR OIL/WATER MIXTURES

(75) Inventor: Joachim Schomburg, Schiffdorf (DE)

(73) Assignee: Urag-Industries GmbH, Bremen (DE)

( * ) Notice: Subject to any disclaimer, the term of this patent is extended or adjusted under 35 U.S.C. 154(b) by 0 days.

(21) Appl. No.: 13/534,475

(22) Filed: Jun. 27, 2012

(65) Prior Publication Data
US 2013/0056429 A1 Mar. 7, 2013

(30) Foreign Application Priority Data
Jun. 27, 2011 (EP) .................................. 11005178

(51) Int. Cl.
B01D 1/20 (2006.01)
B01D 1/16 (2006.01)
B05B 1/02 (2006.01)

(52) U.S. Cl.
USPC ............ 210/808; 210/188; 210/744; 210/86; 239/554; 96/200; 95/266; 95/253; 95/254

(58) Field of Classification Search
None
See application file for complete search history.

(56) References Cited

U.S. PATENT DOCUMENTS

| | | | | |
|---|---|---|---|---|
| 1,511,876 A * | 10/1924 | Ehrhart | ........................... | 96/162 |
| 1,762,432 A * | 6/1930 | Trumble | ........................ | 96/200 |
| RE19,666 E * | 8/1935 | McMurray | .................... | 208/187 |
| 2,398,338 A * | 4/1946 | Walker | .......................... | 516/135 |
| 2,625,236 A * | 1/1953 | Rhinehart et al. | .............. | 96/172 |
| 2,979,156 A * | 4/1961 | Sebald | ............................ | 96/198 |
| 3,116,999 A * | 1/1964 | Armbruster | ..................... | 75/511 |
| 3,387,432 A * | 6/1968 | Ferrara | ............................ | 96/234 |
| 3,561,193 A * | 2/1971 | Baranowski | .................... | 95/253 |
| 3,672,127 A * | 6/1972 | Mayse et al. | .................. | 204/662 |
| 3,971,719 A * | 7/1976 | Peters | ........................... | 210/104 |
| 4,012,207 A * | 3/1977 | Jones | .............................. | 96/184 |
| 4,219,340 A * | 8/1980 | Kaiser | ............................. | 95/266 |
| 4,392,874 A * | 7/1983 | Yamauchi | ....................... | 96/200 |
| 4,659,347 A * | 4/1987 | Schrems | ........................ | 96/192 |
| 4,853,006 A * | 8/1989 | Mangnall | ....................... | 96/200 |
| 5,149,344 A * | 9/1992 | Macy | ............................. | 96/159 |
| 5,256,171 A * | 10/1993 | Payne | ............................. | 95/19 |
| 5,635,080 A * | 6/1997 | Hensley | ........................ | 210/792 |
| 5,900,137 A * | 5/1999 | Homan | ........................... | 210/85 |
| 5,928,519 A * | 7/1999 | Homan | .......................... | 210/741 |
| 6,110,383 A * | 8/2000 | Coombs et al. | ............... | 210/732 |
| 7,087,157 B2 * | 8/2006 | Spani | .......................... | 210/96.1 |
| 7,198,715 B2 | 4/2007 | Herges et al. | | |
| 7,347,945 B2 * | 3/2008 | Amado et al. | ................ | 210/739 |
| 7,597,803 B2 * | 10/2009 | Spani | .......................... | 210/180 |
| 7,654,397 B2 * | 2/2010 | Allouche | ........................ | 96/157 |
| 7,871,526 B2 * | 1/2011 | Allouche | ....................... | 210/739 |
| 8,133,300 B1 * | 3/2012 | Gonsalves et al. | ................ | 95/19 |
| 8,372,294 B2 * | 2/2013 | Grotheim | ....................... | 210/774 |
| 2004/0094460 A1 | 5/2004 | Herges et al. | | |
| 2012/0211445 A1* | 8/2012 | Grotheim | ....................... | 210/808 |
| 2013/0056429 A1* | 3/2013 | Schomburg | .................... | 210/808 |

FOREIGN PATENT DOCUMENTS

DE 195 10 023 C1 5/1996
DE 100 24 124 C1 2/2002

(Continued)

*Primary Examiner* — Robert James Popovics
(74) *Attorney, Agent, or Firm* — Millen, White, Zelano & Branigan, P.C.

(57) ABSTRACT

The present invention relates to a device for separating fluid mixtures, in particular for separating oil and water in a vacuum container, into which the fluid mixture is injected by means of an adjustable truncated-cone round jet nozzle.

8 Claims, 6 Drawing Sheets

FOREIGN PATENT DOCUMENTS

| | | |
|---|---|---|
| DE | 101 29 100 A1 | 1/2003 |
| DE | 10 2006 057 910 A1 | 7/2008 |
| EP | 0 148 444 A2 | 7/1985 |
| GB | 06891 | 6/1913 |
| GB | 982598 A | 2/1965 |

* cited by examiner

DEVICE FOR SEPARATING FLUID MIXTURES, IN PARTICULAR OIL/WATER MIXTURES

The present invention relates to a device for separating fluid mixtures, in particular for separating oil and water in a vacuum container, into which the fluid mixture is injected by means of an adjustable truncated-cone round jet nozzle.

Devices of this species are known in the art. An essential part of the device described in the DE 19510023 C1 is a cone-shaped separating casing located in the vacuum container. Further prior art results from the documents DE 10129100 A1, DE 10024124 C1, EP 0148444 A2, and DE 102006057910 A1. The drawbacks of prior art are the regularly required maintenance tasks, such as for instance that the coalescence bodies described in the EP 0148444 A2 have to be exchanged regularly. In the other devices, cleaning tasks on the separating means have to be performed on a regular basis, for instance on the separating plates of the DE 19510023 C1. Another drawback or prior art is the limited throughput that cannot easily be increased.

There is therefore the necessity to overcome the existing drawbacks of prior art. For this purpose, the device described in the following is proposed.

The solution of the above object is achieved by a device according to claim 1, namely a device for separating fluid mixtures, comprising a vacuum chamber (V), a fluid supply (FZ) through a truncated-cone round jet nozzle (K), a fluid outlet (FA) in the bottom area of the vacuum chamber for discharge of the dried fluid by means of a fluid pump (FP), a gas outlet (GA) that is connected to a vacuum pump (VP), a controllable gas entry (GE), characterized by that the truncated-cone round jet nozzle (K) is composed of a tube (R) with a closed end (E), wherein the tube (R) has a tapered portion before the closed end (E), wherein the tapered portion of the tube reduces the diameter of the tube to 90-30% of the entry diameter ($R_D$), 2-8 holes (L) as exit openings arranged orthogonally to the flow direction (SR) in the area of the tapered portion, wherein the holes (L) respectively have a diameter ($L_D$) between one twentieth and one half of the tube diameter at the taper ($R_J$), a first cap nut (M1) having an outer diameter of 1.25-2.5 times the tube diameter at the taper ($R_J$) with a shoulder-type tapered portion, wherein the shoulder has a height of 0.1-10 mm and a width of 90-70% of the original diameter, a second cap nut (M2) having an outer diameter of 1.25-2.5 times the tube diameter at the taper ($R_J$), with a conical shape, wherein the height of the conical portion ($K_H$) is between 0.01 and 10 mm and the cone angle ($\phi$) is between 10° and 80°, wherein the first and the second cap nuts are arranged at the tube in such a manner that in the area of the holes, a gap (Sp) of 0.01 to 10 mm width ($Sp_b$) is formed.

The device according to the invention is composed of a vacuum chamber preferably having a dome shape (for instance: height=550 mm, diameter=500 mm, volume range from 24 to 84 liters). In the upper portion of the vacuum chamber is the outlet of a truncated-cone round jet nozzle according to claim 7. By the truncated-cone round jet nozzle according to the invention, the inflowing fluid mixture is nebulized in a conical shape, the cone preferably opening upwardly. An entry pump sucks the fluid mixture, in particular oil/water mixture, through a suction strainer in and presses it through the adjustable truncated-cone round jet nozzle mentioned above into the vacuum container.

Preferably, the tube acting as a nozzle holder is introduced with the truncated-cone round jet nozzle from above into the vacuum container. Other forms of execution are however also possible, for instance from below or from the side. In the latter form of execution, the nozzle holder would of course have to be correspondingly angled.

Further, the device according to the invention comprises in the bottom area a fluid outlet, through which the dried fluid, for instance the dried oil, can be discharged.

Preferably, the vacuum container includes a level monitoring device, which may be formed for instance by one or several floating bodies. When the maximum level is reached, the fluid can for instance be discharged by pumping-off through the fluid outlet, whereas when the level minimum is reached, the pump is turned off. In normal operation, it is tried to adjust the pump capacity such that the level is approximately in a middle region.

Furthermore, the vacuum container comprises a gas outlet for evacuating the system. The gas outlet is connected to a vacuum pump that generates the necessary vacuum (−0.9 to −0.2 bar, preferably −0.9 to −0.5 bar) in the vacuum container and for instance conveys to outside through a coalescer filter and a sound absorber. Optionally, another filter, e.g. a charcoal filter can be connected in series, although this is normally not necessary, since the air exiting through the coalescer filter normally has an oil content of less than 5 ppm.

Furthermore, the vacuum chamber comprises a controllable gas entry. Through this gas entry, in operation, always a controlled amount of gas is introduced into the vacuum chamber. Preferably, the gas is ambient air, which in principle does not need to be modified. The inflowing air is guided for instance through an air filter with 10 μm filtration and an aperture with a defined aperture bore of approx. 5 mm and a downstream throttling check valve into the vacuum container. In special cases, the air can be treated before entering into the vacuum chamber, for instance dried. Pre-drying could be recommendable in cases of high air humidity, in particular when a high degree of drying is to be achieved in the separation process. In other special cases, oxygen-depleted gases can be added (or admixed), for instance nitrogen, argon, carbon dioxide, in particular when separating (highly) inflammable fluids.

An essential feature of the device according to the invention is the truncated-cone round jet nozzle already mentioned above for nebulizing the inflowing fluid mixture.

The truncated-cone round jet nozzle is composed of a tube, through which the fluid mixture flows. At its exit end, the tube is tapered. The tapered portion leads to a limitation of the tube diameter to −30% of the diameter at the tube entry. For a tube having a diameter of 45 mm, the diameter in the taper is for instance between 40.5 and 13.5 mm, preferably between 41 and 31 mm. In the tapered portion, holes are arranged orthogonally to the inflow direction of the fluid mixture, through said holes the fluid mixture flowing out. These are preferably 2 to 8, in particular 4 or 6 holes being distributed rotationally symmetrically about the periphery of the taper. The diameters of the holes depend on the tube diameters at the taper and the number of the holes, normally they will not exceed one half of the tube diameter at the taper, further they will normally not be less than one twentieth of the tube diameter at the taper. Referred to a tube diameter at the taper of 40 mm, preferably 4-6 holes having diameters of 20-2 mm will be arranged.

Preferably, the said tube is provided at its outside with a thread facilitating the adjustment of the nozzle mentioned below. The decisive portion of the nozzle is formed by two specially shaped nuts with respective internal threads:

The first nut is a cap nut having an inner diameter of for instance 1.25-2.5 times the tube diameter at the taper. Preferably, the first nut comprises in the area of the nozzle opening a shoulder-type tapered portion. At this place, the outer diameter of the nut is reduced to 90-70% of the original outer diameter. The shoulder height has no major influence on the separating action, normally it is in the order of the gap width defined further below, i.e. between 0.01 and 10 mm. For a tube diameter of 45 mm, the hole diameter can for instance be 2-6 mm. The second nut is also a cap nut with an outer diameter of for instance 1.25-2.5 times the tube diameter at the taper, which has in the area of the nozzle exit a conical shape. The cone angle $\phi$ can be between 10° and 80°, preferred are values between 45° and 80°. The height of the conical part is normally in the order of the gap width defined further below, i.e. between 0.01 and 10 mm. For a tube diameter of 45 mm, it may for instance be 2-5 mm.

In a preferred embodiment of the invention, both nuts have the same outer diameters. The height of the nuts has no major influence on the separation result. It mainly depends on the geometric conditions of the tube and can be determined by the man skilled in the art without any further inventiveness.

In a preferred embodiment of the invention, both nuts are secured by respective lock nuts. When screwing the said nuts on, a gap is formed at the level of the exit openings of the guide tube, the gap width of which can be modified in a simple manner. The gap width can thus easily be adjusted to different fluid mixtures, flow rates or other process parameters (temperature, pressure, fluid viscosity). The gap width can be selected between 0.01 and mm, preferably between 0.5 and 1.5 mm. The cone angle $\phi$ also depends on the parameters mentioned above, in particular the type of the fluid mixture and the process parameters. The angle $\phi$ can be adjusted between 10° and 80°, preferred are values between 45° and 80°.

Although the embodiment mentioned above having threads (external thread of the tube, internal thread of the nuts) is preferred, due to the easy adjustment, the man skilled in the art knows of course other possibilities to connect corresponding cap rings with a tube, so that an easy adjustment is given, for instance using correspondingly shaped locking rings that are in turn secured with screws or by springs, in place of the above nuts.

The nozzle according to the invention is easily scalable, so that it can be adapted to correspondingly larger devices. For a tube diameter of approx. mm, a throughput of 25 to 70 liters/min of an oil/water mixture can be achieved.

An important aspect of the invention is thus a truncated-cone round jet nozzle (K) for nebulizing fluids, comprising a tube (R) with a closed end (E), wherein the tube comprises a tapered portion of the tube before the closed end (E), wherein the tapered portion of the tube reduces the diameter of the tube to 90-30% of the entry diameter ($R_D$), 2-8 holes (L) as exit openings arranged orthogonally to the flow direction (SR) in the area of the tapered portion, wherein the holes respectively have a diameter ($L_D$) between one twentieth and one half of the tube diameter at the taper ($R_J$), a first cap nut (M1) having an outer diameter of 1.25-2.5 times the tube diameter at the taper ($R_J$) with a shoulder-type tapered portion, wherein the shoulder has a height ($M_{1H}$) of 0.1-10 mm and a width ($M_{1B}$) of 90-70% of the original diameter, a second cap nut having an outer diameter of 1.25-2.5 times the tube diameter at the taper ($R_J$), with a conical shape, wherein the height of the conical portion ($K_H$) is between 0.01 and 10 mm and the cone angle ($\phi$) is between 10° and 80°, wherein the first and the second cap nuts are arranged at the tube in such a manner that in the area of the holes, a gap (Sp) of 0.01 to 10 mm width ($Sp_B$) is formed.

For mobile use, for instance on ships, in vehicles or airplanes, the device optionally further comprises an inclination limitation for the floating body. This inclination limitation device is essentially composed of a central tube, in which the floating body can move. This tube is open at the lower and upper ends, so that the fluid tube content interacts with the total fluid of the vacuum container content. The said device leads to that when the total device is inclined, as it may happen for instance on ships, the float will only slightly differ from the respective full position with upright arrangement and can thus reliably perform the said pump cycles. This limitation device is extremely important for instance for ships, when caused by heavy sea the ship and the devices thereon will undergo pitching and rolling movements. In tests could be shown that the function of the system will completely be maintained even for rolling angles of 15° to both sides.

In FIGS. 5 and 6, such an inclination limitation device is shown. In this case, two floating bodies (S1 and S2) are even used, which can move in the vertical direction on a central tube ($R_S$). The floating bodies respectively have upper and lower stops ($S_{O1}$, $S_{O2}$, $S_{U1}$ and $S_{U2}$). The position of the floating bodies can for instance be detected by a magnetic marking in co-operation with a corresponding reed contact. Alternatively, further embodiments are imaginable, for instance also on an optoelectronic basis. In this case, the level desired for normal operation is between the upper stop of the lower floating body ($S_{O1}$) and the lower stop of the upper floating body ($S_{U2}$) (see FIGS. 5 and 6). In this desired normal operation, both floating bodies rest therefore against the said stops. When there is a deviation from this condition (by decreasing or increasing levels), respective control systems for the pumps can be activated, in order to come back to normal operation.

After turning the device on, first the vacuum pump is started, which evacuates the vacuum chamber. Therein, pressures of −0.9 to −0.2 bar, preferably −0.9 to −0.5 bar are adjusted.

The entry pump supplies the oil into the vacuum container, until the level float starts the exit pump. The latter transports the dried fluid collected at the bottom area of the vacuum container into a container. In many cases, e.g. in mobile use on ships, in vehicles or airplanes, the fluid is conducted in a cycle, that means, the separated (for instance dried) fluid is returned to the suction location (e.g. an oil container).

When the fluid mixture is an oil/water mixture, preferably temperatures between 40° and 70° C. are adjusted. At this temperature, the mixture is injected into the vacuum container through the truncated-cone round jet nozzle mentioned above, the contained water droplets being transformed into water vapor. This generated water vapor is sucked on together with the air of the vacuum pump flowing-in through an air filter and conducted through a coalescer filter and a sound absorber toward outside. Optionally, a charcoal filter can be connected in series, which is however normally not necessary, since the air exiting through the coalescer filter has normally an oil content of <5 ppm. The inflowing air is conducted through an air filter with 10 µm filtration and an aperture with a defined aperture bore of approx. 5 mm and a downstream throttling check valve into the vacuum container. By the heat introduced together with the fluid, a temperature is obtained within the vacuum container that allows that the ambient air can take-up the water vapor.

By the nozzle shape it is possible, among others, to dry motor oils, even diesel oil can be dried.

The device according to the invention can be employed in most various technical fields, for instance in power plants, industrial plants, sea and airships, vehicles and airplanes.

Preferably, the device is used for drying fluids, for instance hydraulic oil, lubricating oil, gearbox oil, motor oil, turbine oil and/or diesel oil.

The advantages of the device according to the invention compared to prior art are summarized as follows:

Compared to devices, wherein the separation is carried out by means of centrifugal forces, the method according to the invention is clearly more efficient, since by the centrifugal method only small volume flows of <20 liter/min are possible.

Compared to vacuum driers with surface-enlarging shaped bodies it has to be noted that the device according to the invention is characterized by a more compact design and is clearly less prone to contamination. Corresponding considerations apply for vacuum driers with a helical fluid guiding, as for instance described in the DE 10024124 C1.

Furthermore, the device according to the invention overcomes a prejudice existing in professional circles, as for instance described in the DE 10024124 C1 (see paragraph 0006 thereof): According to this prejudice, there are, for devices for separating water from oil, wherein the oil is nebulized by means of a nozzle in a vacuum chamber, some drawbacks such as for instance a re-entry of air and water into the oil, a susceptibility to contamination and a non-controllable formation of foam. These prejudices can be proven wrong by the device according to the invention, wherein even for longer-lasting operation and for contaminated and/or highly viscous oils, the described drawbacks do not exist.

Because of the particular efficiency of the truncated-cone round jet nozzle, it can also be used independently from the described vacuum separating device. For instance, by means of the described truncated-cone round jet nozzle, even water can finely be nebulized, so that the use in green houses, sprinkler systems, but also in other industrial systems, for instance for the removal of dust is possible. Equally, the truncated-cone round jet nozzle in can be used in any systems for nebulizing any fluids, for instance in the petrol industry or in chemical systems.

LIST OF REFERENCE SIGNS

Figure 1:
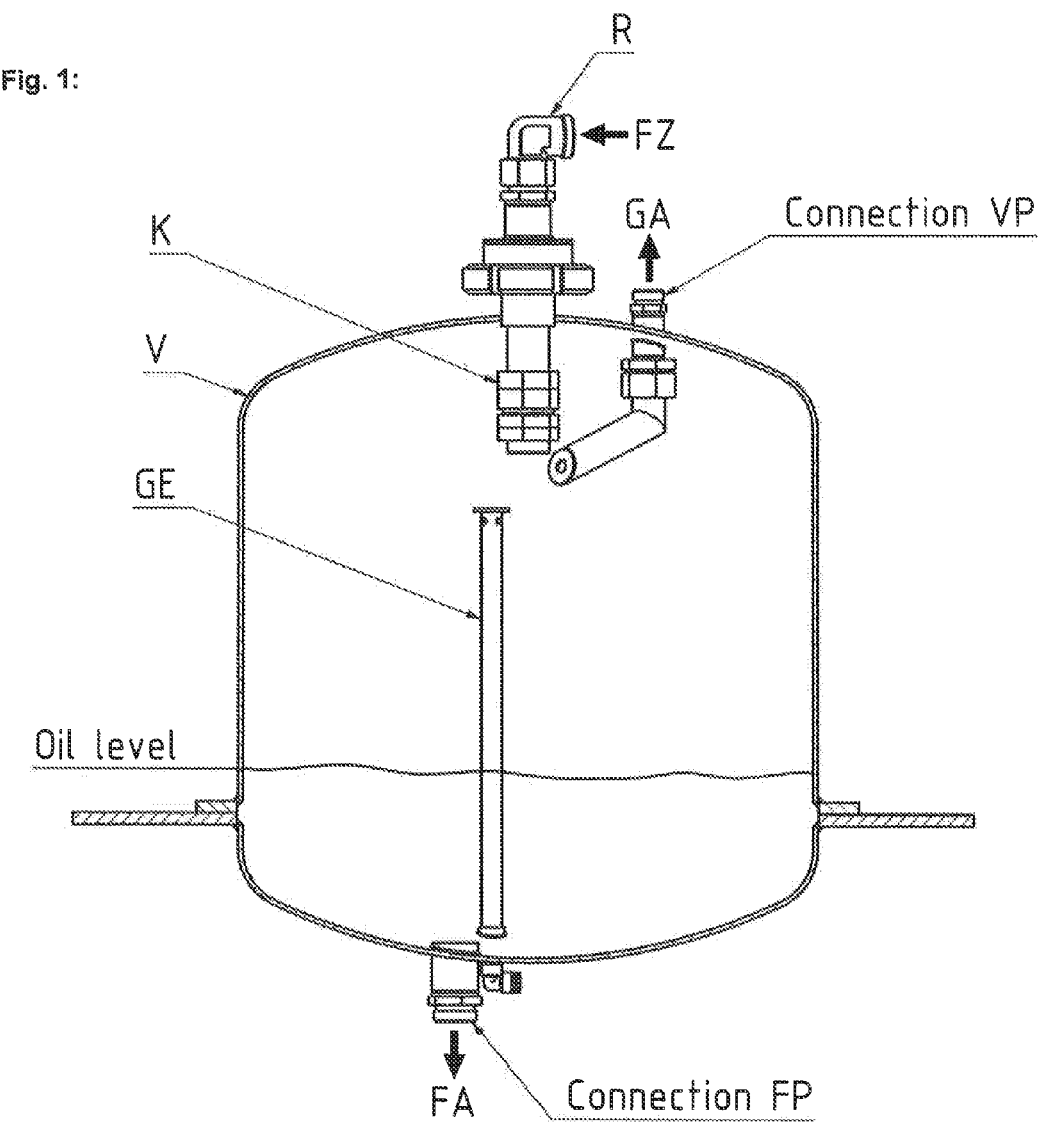
FIG. 1 shows the basic structure of a device according to the invention comprising a truncated-cone round jet nozzle, a gas inlet, a gas outlet and a fluid outlet.
Figure 2:
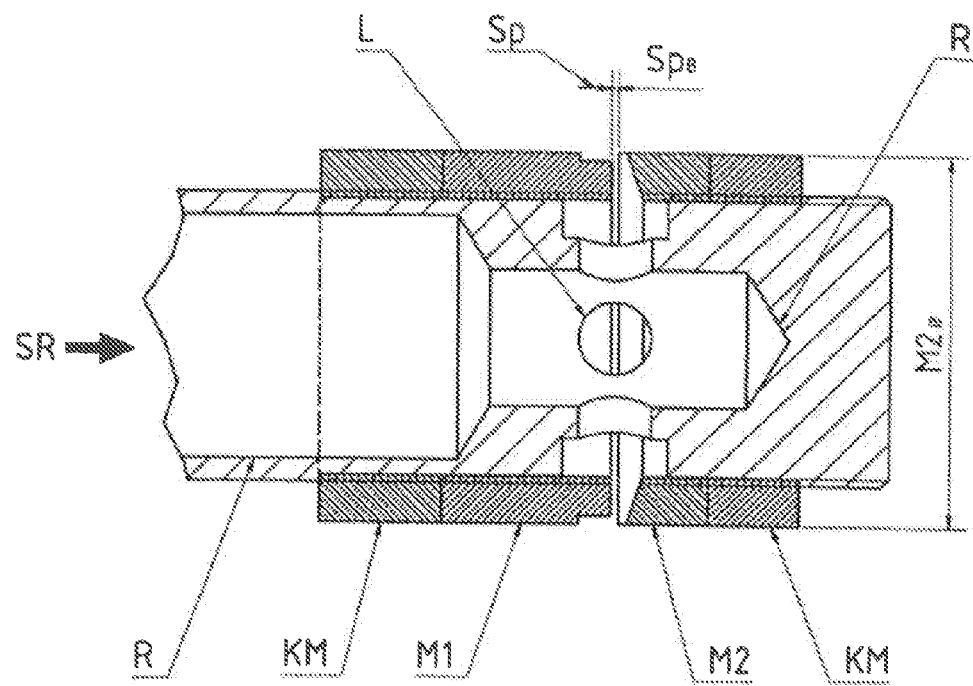
FIG. 2 shows the structure of the truncated-cone round jet nozzle according to the invention.
Figure 3:
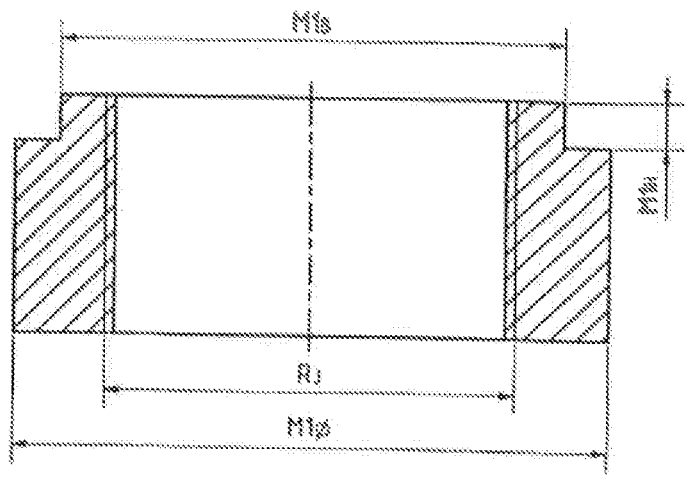
FIG. 3 shows the first cap nut with the shoulder-type tapered portion.
Figure 4:
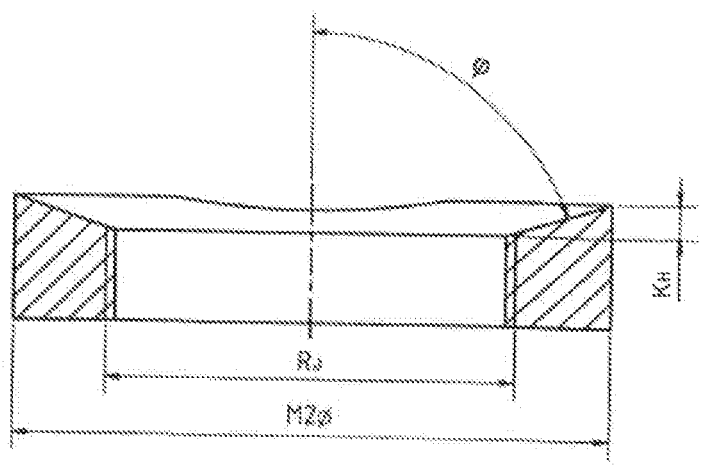
FIG. 4 shows the second cap nut with a conical shape.
Figure 5:
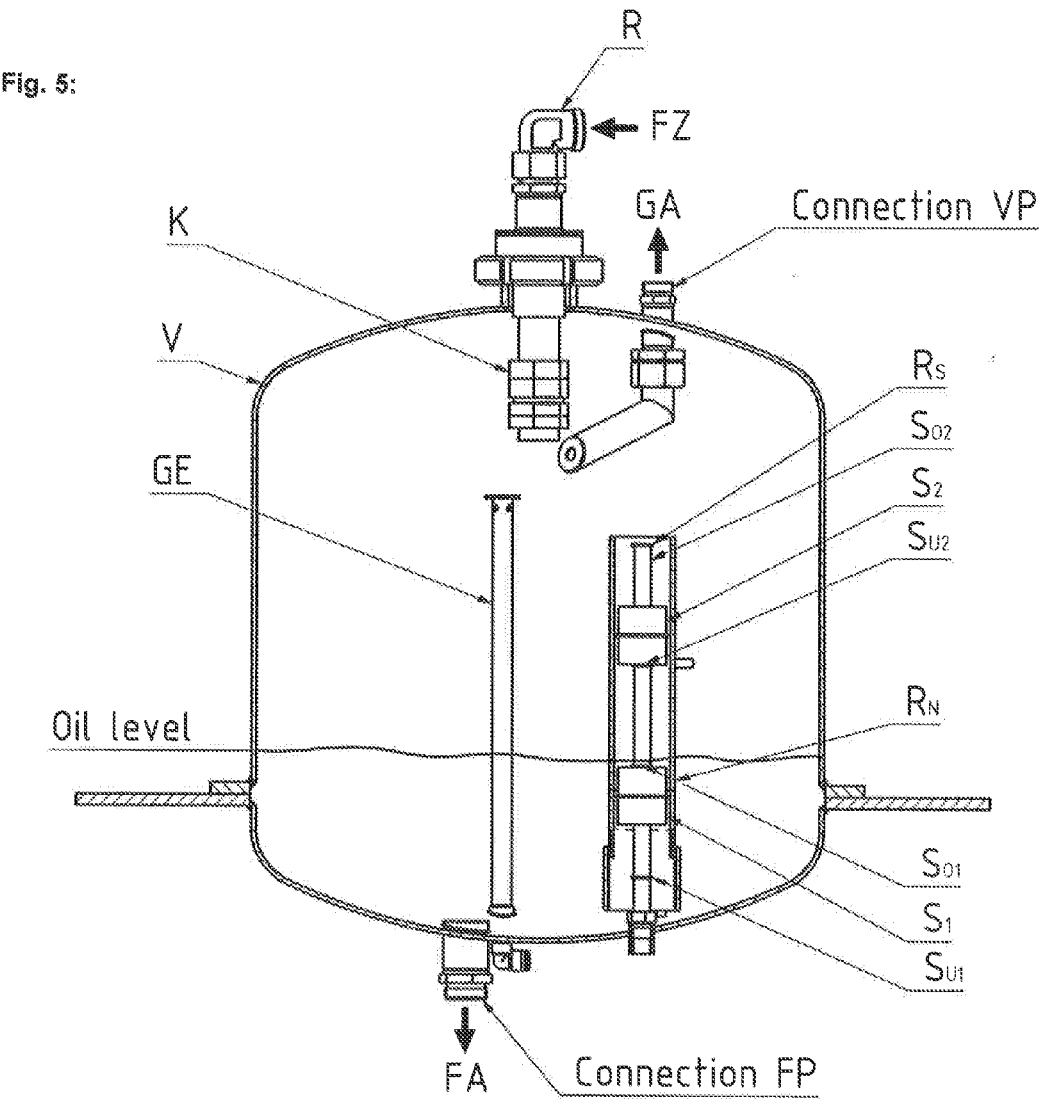
FIG. 5 shows the device according to the invention comprising an inclination limitation device.
Figure 6:
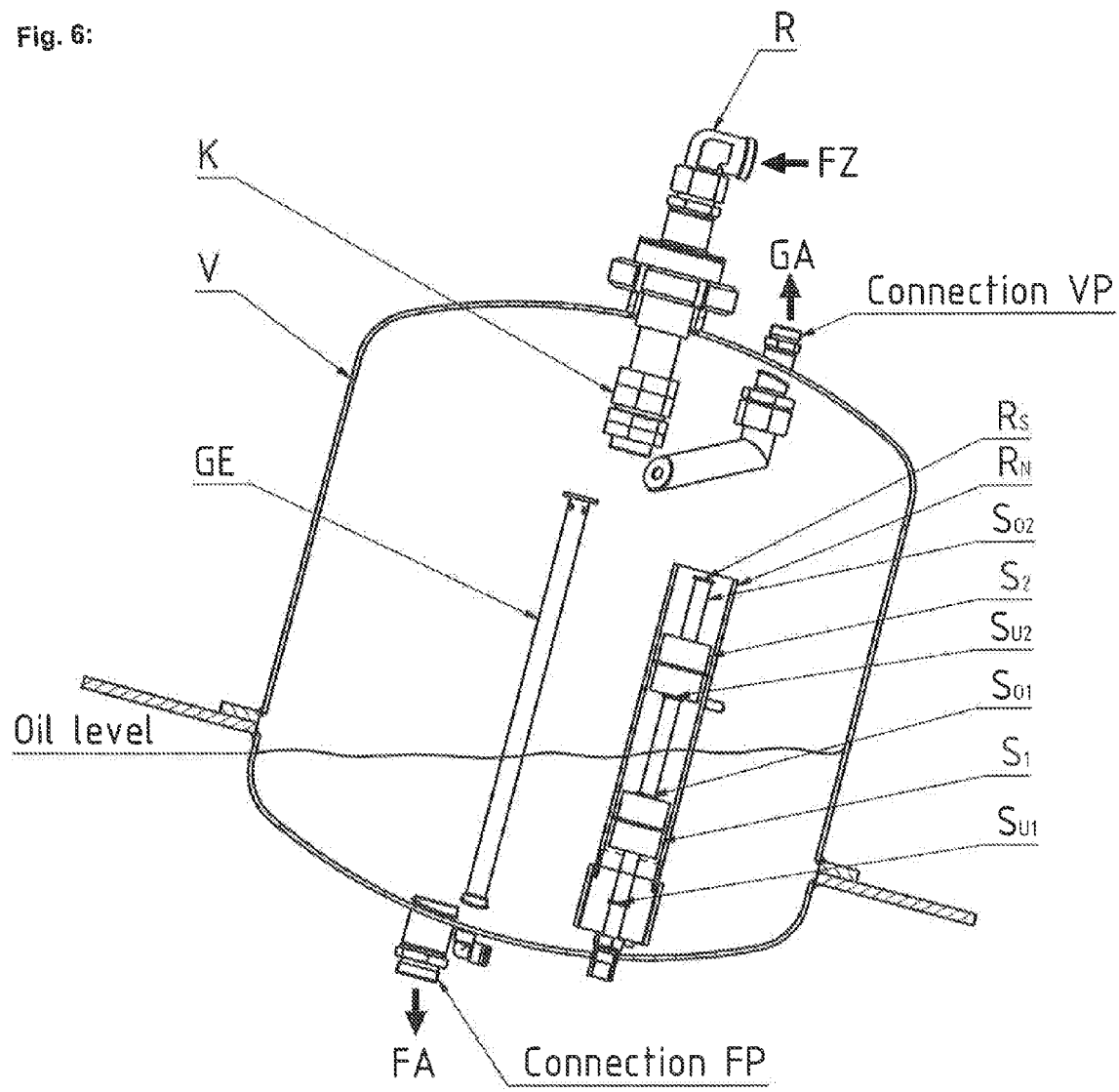
FIG. 6 also shows the device according to the invention comprising an inclination limitation device, wherein the total system is shown in an inclined position.

R tube
$R_D$ tube diameter at tube entry
$R_J$ tube diameter in the tapered portion of the tube
L hole with hole diameter $L_D$
E closed tube end
M1 first cap nut with shoulder-type tapered portion
$M1_H$ height of the shoulder of the first cap nut
$M1_B$ width of the shoulder of the first cap nut
$M1_\phi$ outer diameter of the first cap nut with the shoulder-type tapered portion
M2 second cap nut with a conical shape
$M2_\phi$ outer diameter of the second cap nut with a conical shape
Φ cone angle
$K_H$ cone height
Sp gap with width $Sp_B$
SR flow direction
KM lock nut
GE gas inlet
GA gas outlet
FZ fluid supply
V vacuum chamber
VP vacuum pump
FP fluid pump
FA fluid outlet
K truncated-cone round jet nozzle
$R_N$ outer tube of the inclination limitation device
$R_S$ inner tube of the inclination limitation device
S floating body
$S_O$ upper stop of the floating body
$S_U$ lower stop of the floating body

The invention claimed is:

1. A device for separating fluid mixtures, comprising
a vacuum chamber (V),
a fluid supply (FZ) through a truncated-cone round jet nozzle (K),
a fluid outlet (FA) in the bottom area of the vacuum chamber for discharge of the dried fluid by means of a fluid pump (FP),
a gas outlet (GA) that is connected to a vacuum pump (VP),
a controllable gas entry (GE),
characterized by that the truncated-cone round jet nozzle (K) is composed of
a tube (R) with a closed end (E),
wherein the tube (R) has a tapered portion before the closed end (E),
wherein the tapered portion of the tube reduces the diameter of the tube to 90-30% of the entry diameter ($R_D$),
2-8 holes (L) as exit openings arranged orthogonally to the flow direction (SR) in the area of the tapered portion, wherein the holes (L) respectively have a diameter ($L_D$) between one twentieth and one half of the tube diameter at the taper ($R_J$),
a first cap nut (M1) having an outer diameter of 1.25-2.5 times the tube diameter at the taper ($R_J$) with a shoulder-type tapered portion,
wherein the shoulder has a height of 0.1-10 mm and a width of 90-70% of the original diameter,
a second cap nut (M2) having an outer diameter of 1.25-2.5 times the tube diameter at the taper ($R_J$), with a conical shape, wherein the height of the conical portion ($K_H$) is between 0.01 and 10 mm and the cone angle (φ) is between 10° and 80°,
wherein the first and the second cap nuts are arranged at the tube in such a manner that in the area of the holes, a gap (Sp) of 0.01 to 10 mm width ($Sp_b$) is formed.

2. The device according to claim 1, characterized by that the tube (D) has an external thread.

3. The device according to claim 1, characterized by that a level monitoring device for determining the fluid level is formed by means of at least one floating body (S) with an upper ($S_O$) and a lower ($S_U$) stop.

4. The device according to claim 3, characterized by an inclination limitation device comprising a tube ($R_N$), in which at least one floating body is arranged, which is vertically arranged in the middle of the vacuum chamber, and which has apertures at top and bottom.

5. A method for drying oils, such as for instance hydraulic oil, lubricating oil, gearbox oil, motor oil, turbine oil and/or diesel oil, comprising passing the oil through a device according to claim 1.

6. A method for drying fluid in power plants, industrial plants, sea and airships, vehicles or airplanes, comprising passing said fluid through a device according to claim 1.

7. A truncated-cone round jet nozzle (K) for nebulizing fluids, comprising
- a tube (R) with a closed end (E),
- wherein the tube comprises a tapered portion before the closed end (E),
- wherein the tapered portion of the tube reduces the diameter of the tube to 90-30% of the entry diameter ($R_D$),
- 2-8 holes (L) as exit openings arranged orthogonally to the flow direction (SR) in the area of the tapered portion, wherein the holes respectively have a diameter ($L_D$) between one twentieth and one half of the tube diameter at the taper ($R_J$),
- a first cap nut (M1) having an outer diameter of 1.25-2.5 times the tube diameter at the taper ($R_J$) with a shoulder-type tapered portion,
- wherein the shoulder has a height ($M_{1H}$) of 0.1-10 mm and a width ($M_{1B}$) of 90-70% of the original diameter,
- a second cap nut having an outer diameter of 1.25-2.5 times the tube diameter at the taper ($R_J$), with a conical shape, wherein the height of the conical portion ($K_H$) is between 0.01 and 10 mm and the cone angle ($\phi$) is between 10° and 80°,
- wherein the first and the second cap nuts are arranged at the tube in such a manner that in the area of the holes, a gap (Sp) of 0.01 to 10 mm width ($Sp_B$) is formed.

8. The truncated-cone round jet nozzle (K) according to claim 7, characterized by that the tube (R) has an external thread.

* * * * *